March 31, 1953     H. R. BILLETER     2,633,038
AUTOMATIC CYLINDER RIDGE REAMER
Filed Feb. 9, 1949
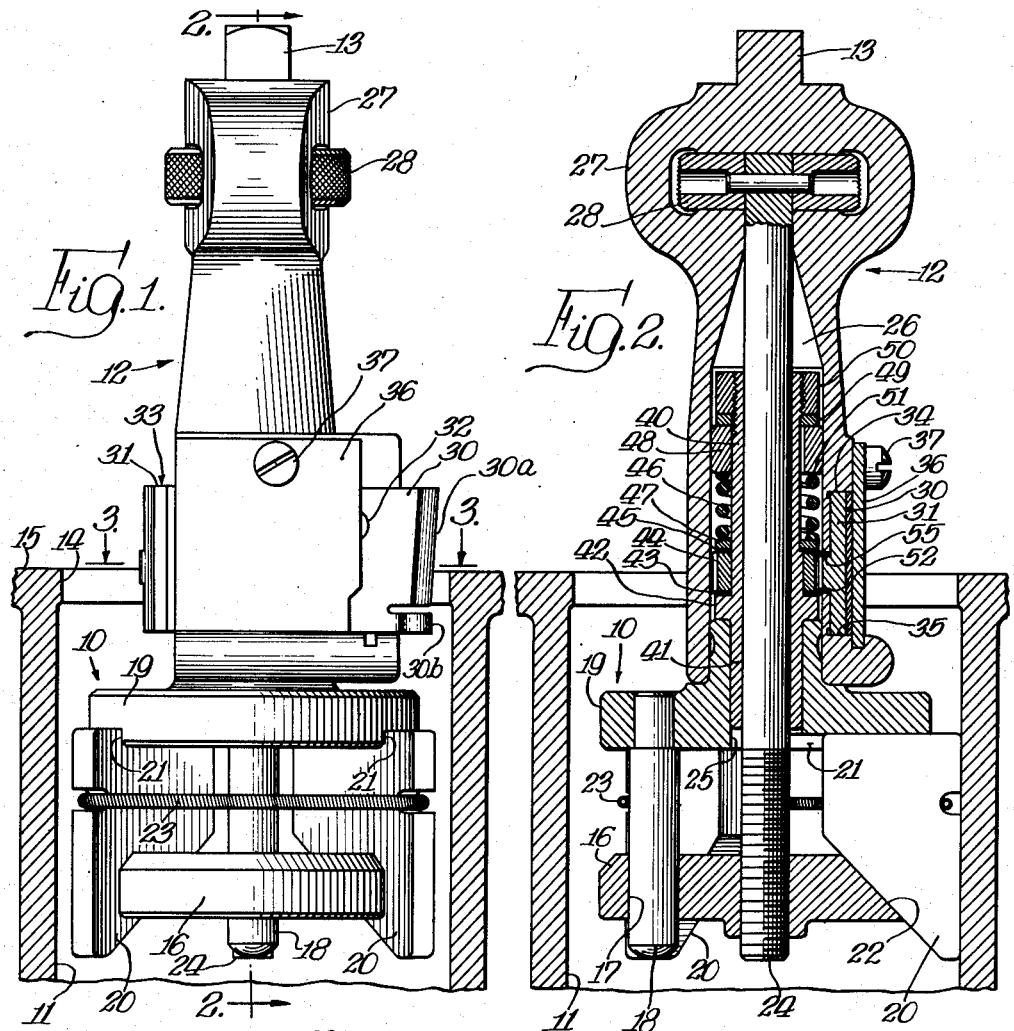
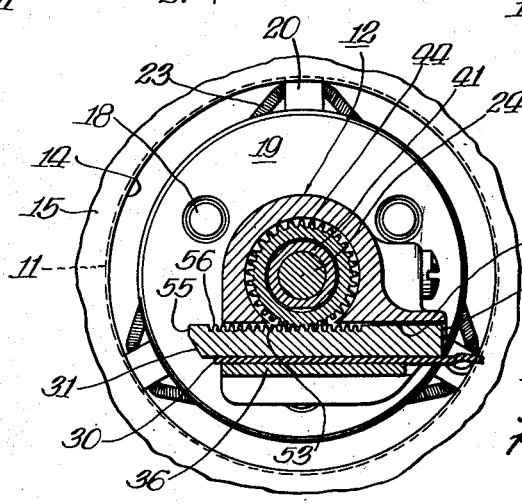
INVENTOR.
Henry Robert Billeter,
BY
Fidler, Crouse & Beardsley
Attys.

Patented Mar. 31, 1953

2,633,038

UNITED STATES PATENT OFFICE 2,633,038

AUTOMATIC CYLINDER RIDGE REAMER

Henry Robert Billeter, Highland Park, Ill., assignor to Ammco Tools, Inc., North Chicago, Ill., a corporation of Illinois Application February 9, 1949, Serial No. 75,458

7 Claims. (Cl. 77—2)

My invention relates to cylinder ridge reamers adapted for the removal of circumferential ridges formed by wear occasioned by movement of piston rings along a cylinder wall surface.

Automobile, marine and other types of engines having reciprocating pistons fitted with piston rings are subject to cylinder wall wear by the sliding action of the piston rings on the comparatively soft cylinder walls during operation of the engine. The extent of reciprocation of the pistons being such that the piston ring supported on the uppermost portion of the piston never moves to the end of the wall, an annular ridge is gradually formed in the top of the cylinder wall. This ridge, commonly called a ring-wear ridge, must be removed when it becomes necessary to recondition the engine, for example, by installing new piston rings. To this end, an object of my invention is to provide an improved cylinder ring-wear ridge reamer which is of simple construction and which is adapted for removing cylinder ridges more quickly and more efficiently.

Another object is to provide a device of the foregoing character having a reamer blade which is expanded and retracted automatically by rotation thereof relative to the ridge to be reamed.

Still another object is to provide means automatically controlling the extent of expansion of the reamer blade to insure proper depth of cut as the reamer blade is rotated in cutting relation to the ridge to be reamed.

A further object is to provide a tool of the foregoing character, wherein the reamer blade is automatically adjustable by the rotational movement thereof to cut ring-wear ridges from cylinders of varying sizes, to control the cutting pressure applied to the reamer blade and in turn the depth of cut at all cutting positions along the ring-wear ridge, and to stop the expansion of the reamer blade and the reaming action when the ring-wear ridge has been completely removed.

An additional object is to provide a device of the foregoing character wherein the reamer blade is automatically expanded to engage its cutting edge with the ring-wear ridge upon rotational movement of its support relative to such ridge, the arrangement being such that expansion of the blade is stopped when it is engaged with such ridge under a predetermined pressure.

Still another object is to provide a device of the foregoing character wherein injury to the reamer blade is prevented upon reversal of direction of rotation.

A more specific object is to provide a device of the foregoing character having one part adapted for adjustable rigid support in a cylinder and another part rotatable thereon and supporting a reamer blade having a cutting edge adapted to engage the ring-wear ridge to be reamed, and wherein the reamer blade is expanded by drive means actuated by rotation of the rotatable part, such drive means including a slip-drive connection adapted to terminate the blade expansion action when the latter is engaged with the ring-wear ridge under a predetermined pressure.

Other objects and advantages will become apparent from the following description taken in conjunction with the appended drawings, wherein:

Figure 1 is a front elevational view of a cylinder ridge reamer embodying my invention, the tool being shown supported in a cylinder preparatory to removal of a ring-wear ridge therefrom;

Fig. 2 is a vertical sectional view of the device shown in Fig. 1 taken substantially along the line 2—2 of Fig. 1; and Fig. 3 is a horizontal sectional view taken substantially along the line 3—3 of Fig. 1.

In carrying out my invention, the cylinder ridge reamer may be provided with a base portion adapted to support the device internally of an engine cylinder 15 for relative rotation of a head portion on the axis of the cylinder, such for example as disclosed in the Wallace F. Mitchell Patent No. 2,380,605, issued July 31, 1945. The rotatable head portion provides support for a reamer blade, preferably of the flexible type to prevent chattering as more particularly disclosed in my co-pending application Serial No. 769,816, filed August 21, 1947 for Cylinder Ridge Reamer. The parts or portions just referred to will be described generally herein, it being understood that the specific structural details may readily be determined from the aforementioned patent and application disclosures.

Referring now to the ridge reamer shown in the drawings, it comprises a base portion 10 adapted to engage the cylinder wall 11 to fixedly support the device therein. A head portion 12 is supported for rotation on the base portion 10. It has a squared end or shank 13 adapted to receive a wrench (not shown) or other means which a workman may use to rotate the head portion 12 when removing a ring-wear ridge such as ring-wear ridge 14 located adjacent the top of cylinder 15. The head portion 12 adjustably supports the reamer blade 30 in accordance with my invention.

Specifically, the base 10 is comprised of a lower disk-shaped plate 16 having a plurality of circumferentially and radially disposed transverse openings 17 for slidably receiving pilot pins 18 having their upper ends secured in an upper disk-shaped plate 19. The pilot pins 18 prevent relative rotational movement of the plates 16 and 19 and at the same time allow the plates to be displaced relatively axially. Three similar clamping jaws 20 are disposed between the plates 16 and 19 in radial fashion and are slidably supported along their top sides in radially arranged slots 21 disposed normal to the axis and in the underside of plate 19. The lower sides of the jaws 20 are inclined upwardly and inwardly and are received in correspondingly inclined cam slots 22 disposed in the lower plate 16 for simultaneously camming the three jaws 20 outwardly as plate 16 is moved axially toward plate 19. Conversely, as plate 16 is moved axially away from plate 19, the cam slots 22 allow the jaws 20 to move radially inwardly under the edge of a garter spring 23 encircling the three jaws 20.

Means for manually expanding or retracting the jaws 20 includes a rod 24 which has its lower end threadedly engaged with the lower plate 16 and is extended upwardly and freely through an opening 25 in the plate 19 and an axially disposed bore 26 in the head portion 12 to a cage-like head 27 which forms the upper part of the head portion 12. The cage-like head 27 is slotted transversely its narrowmost portion for freely and partially enclosing a knurled adjusting wheel 28 which is secured to the upper end of rod 24 to permit manual rotation of the rod with the resulting expansion or retraction of the jaws 20. The knurled wheel 28 and its attached rod 24 may be rotated independently of the head portion 12, or the head portion may be rotated without angularly displacing the rod 24. This arrangement allows the jaws 20 to be expanded into frictional clamping engagement with the cylinder wall 11 to fixedly secure the base portion 10 in axial alignment with the cylinder 15 and permit the subsequent rotation of the head portion 12 without releasing the jaws 20 from the cylinder wall 11.

The head portion 12 is rotatably mounted upon the base portion 10 in such a way that the cutting edge of the reamer blade 30 carried thereby is aligned with the ridge 14 to be removed. As stated above, the reamer blade 30 is preferably of the flexible type disclosed in detail in my aforementioned co-pending application Serial No. 769,816. According to my present invention, the reamer blade 30 is supported in such a manner that it is expanded and contracted by mere rotation of the head portion 12 relative to the base portion 10, suitable drive means being provided between the head portion 12 and blade 30 to accomplish this, as will be described in detail hereinafter. Also, the drive means just referred to includes a slip connection by which expansion of the blade 30 is stopped when a predetermined expanding pressure is applied so that the reamer blade does not "dig in" or tend to cut too deeply as rotation is continued.

More particularly, the blade 30 is removably supported and positioned on a rectangularly-shaped blade carrier 31 by means of two dowel pins 32 (one shown, Fig. 1) to provide a reamer blade unit 33 carried by the head portion 12 and adapted for rotative movement therewith. To this end, suitable track-ways 34 and 35 disposed normal with the axis of the head portion 12 are arranged in parallel relation in the side walls of the head portion for movably receiving and guiding the blade unit 33 in a direction transverse of the axis of the head portion and into reaming relation with the ring-wear ridge 14. The blade unit 33 is removably retained in the track-ways 34 and 35 by a cover plate 36 which is removably secured to the head portion 12 by suitable fastening means, for example screw 37.

The means for expanding the reamer blade unit 33 and, in turn, the reamer blade 30 into operative relation with the ring-wear ridge 14 by rotation of the head portion 12 comprises a sleeve-like member 40 having an axially disposed bore for freely receiving the jaw expanding rod 24. One end 41 of the sleeve 40 is fixedly secured in the bore 25 provided in upper plate 19 of the base portion 10. The sleeve 40 has an integral annular flange 42 intermediate its ends which provides a flat top surface disposed normal to the axis of the sleeve for receiving a washer-like friction element 43, the purpose of which will become obvious hereinafter. A spur gear 44 having parallelly related end walls is adapted to be rotatably supported on the sleeve 40 and to have its lower end wall seated on the friction washer 43, while its upper end wall is seated against a flat friction washer 45. The washers 43 and 45 may be comprised of fiber, brass or other material selected with respect to their desired coefficient of friction, dependent upon the material of the spur gear 44 and the adjusted surface pressures between the washers and the spur gear.

The blade expanding means is provided further with a compression spring 46 encircling the sleeve 40 and resting at its bottom end on a pressure transmitting washer 47 seated upon the upper side of the friction washer 45, whereby a constant and uniform pressure is exerted through the friction washers 43 and 45 on the respective sides of the spur gear 44 as determined by the loaded condition of the spring which is accomplished in the following manner. A pressure collar 48 is freely supported on the sleeve 40 in abutting relation with the upper end of the spring 46. A washer 49 is also disposed on the top side of the pressure collar to directly receive the pressure exerted by an adjusting nut 50 mounted on the upper threaded end of sleeve 40. The nut 50 is adjustable to compress the spring 46 to provide the desired torsional friction of the washers 43 and 45 with the gear 44. Washer 49 and pressure transmitting washer 47 are keyed to the sleeve 40 by a flat surface 51 extending longitudinally of the sleeve from its upper end to a point below the upper face of friction washer 45 and by a non-arcuate bore portion in each of the washers 47 and 49. The keyed portions allow the adjusting nut 50 to be rotated on its screw threads and along the screw threads of the sleeve 40, while making tension adjustments without a tendency to rotate or damage the spring 46. Likewise, a force causing the spur gear 44 to be angularly displaced on the tube 40 will not tend to cause the spring 46 to be displaced because of the interposed and keyed pressure transmitting washer 47. However, the keyed portions in no way interfere with axial movement of any of the washers, the spur gear or collar relative to the sleeve 40 when assembling or disassembling the structure. It is apparent from the drawings and the foregoing description that the tension adjusting means, frictional means and the spur gear 44 are enclosed in the enlarged bore 26 provided in the head member 12 where they are protected from damage which might result from rough handling of the tool. Further, the adjusting nut 50 may be factory-set for a predetermined torsional frictional resistance of the spur gear 44 relative to the sleeve 40 to compensate for structural variations and manufacturing tolerances without danger of the adjustment being changed so long as the tool remains in its assembled state. Also, the setting of the adjustment nut 50 determines the pressure at which the drive means will slip to avoid the exertion of excess expanding pressure on the blade unit 33 and blade 30.

In the use of the structure so far described, the reamer blade unit 33 is rotated with the head portion 12 about the axis of the spur gear 44 which is yieldably and frictionally supported to resist angular displacement relative to its supporting base portion 10. This relative angular movement of the reamer blade unit 33 to the spur gear 44 is utilized to automatically expand or retract the blade unit in accordance with the direction of rotation imparted to the head portion 12. Specifically, the side wall of the head portion 12 is cut-away to form a slot or channel 52 having a flat bottom face 54 disposed parallel with the axis of and transverse the head portion and having a depth sufficient to form an opening 53 in the side wall to allow at least the entire length of two teeth of the spur gear 44 to project therethrough and radially beyond the face 54 of the channel 52. The channel 52 has a width adapted to slidably receive a reduced and rib-like portion 55 integral with the blade holder 31 which has a portion of its surface cut away intermediate its ends to provide a toothed rack 56 which is engaged with the teeth on the spur gear 44. By having the toothed rack 56 terminate inwardly from each end of the rib-like portion 55, transverse movement of the reamer blade unit 33 is limited in each direction in accordance with the capacity of the tool and dislodgment of the reamer blade unit from the head portion 12 is prevented when the tool is not employed in an actual ring-wear ridge reaming operation. With the rack and gear arrangement just described, rotation of the head portion results in expansion or contraction of the reamer blade, depending on the direction of rotation, and, if the expanding pressure tends to exceed that required to effect the proper engagement of the cutting edge of the blade with the ridge 14, the disc connection afforded by the discs 43 and 45 with the gear 44 will slip and further tendency of the blade 30 to expand will cease so that the proper cutting depth of the blade will be maintained. This action is facilitated by the flexible blade construction of my aforesaid co-pending application.

The operation and use of my self-adjusting cylinder ridge reamer is comparatively simple. The automatic self-adjusting feature is equally effective when the tool is used in various sizes of engine cylinders. It is entirely fool-proof and may be used by unskilled labor. Manual adjustment of the reamer blade or blade unit is unnecessary after the tool has been clamped in the cylinder. The cutting pressure remains substantially constant in accordance with the factory setting of the adjustment nut 50 for the compression spring 46.

In use, the tool is inserted into the cylinder 15 an extent sufficient to horizontally align the cutting edge 30a of the reamer blade 30 with the ring-wear ridge 14 to be removed. In this position of the tool, the knurled wheel 28 is rotated to radially expand the clamping jaws 20 into clamping engagement with the cylinder wall 11 to support the tool at the proper height in the cylinder and to securely hold the base portion 10 from rotation during use of the tool. A wrench or other suitable means is placed on the shank 13 and the head portion 12 is rotated in a clockwise (Fig. 3) direction. Rotation of the head portion 12 causes the reamer blade unit 33 to be expanded outwardly to bring the cutting edge 30a into contact with the ring-wear ridge 14. In this manner, the reamer blade 30 is expanded automatically during clockwise rotation of the head portion 12 as a result of the cooperation of the toothed rack 56 with the spur gear 44 and its frictional connection with the base portion 10. When the cutting edge 30a contacts the ring-wear ridge 14, further rotation of the head portion 12 will cause the toothed rack 56 to rotate the spur gear 44 between the friction washers 43 and 45. As the ring-wear ridge is cut away during the reaming operation, the friction provided by the washers 43 and 45 on the spur gear 44 continuously exerts a force tending to further expand the reamer blade unit 33 and maintain the cutting edge 30a in contact with the ring-wear ridge at a cutting pressure determined by the pre-set load applied to the compression spring 46. This cutting pressure is maintained by the slip-clutch action afforded by the washers 43 and 45 with respect to the gear 44 in that these parts slip relative to each other when the pressure exerted against the cylinder wall by the rotation of head 12 exceeds a predetermined amount. Continued clockwise rotation of the head portion 12 will eventually result in the ring-wear ridge 14 being completely reamed away so that the cylinder wall 11 forms a continuous and uninterrupted surface extending to the top of the cylinder 15. When this condition is obtained the curved limit portion 30b of the reamer blade 30 limits against the cylinder wall 11, below the ring-wear ridge 14, and prevents further cutting action of the cutting edge 30a as well as further expansion of the reamer blade unit 33, as fully explained in my aforesaid pending application Serial No. 769,816. The ring-wear ridge having been removed, the tool is easily removed from the cylinder simply by rotating the head portion 12 counterclockwise to retract the cutting edge 30a from the cylinder wall. The knurled wheel 28 then is rotated to lower the plate 16 and allow the garter spring 23 to draw the jaws 20 inwardly of the tool and out of clamping engagement with the cylinder walls. If the next cylinder to be treated has a different internal diameter than that had by the previous cylinder treated, no change nor adjustment is required in the tool. The workman merely inserts the tool in the cylinder and proceeds as already explained. The reamer blade unit of the tool will automatically be expanded into reaming relation with the ring-wear ridge where it will be held at a normally invariable reaming pressure during clockwise rotation of the head portion 12. Dig-in and chatter of the reamer blade on the ring-wear ridge is minimized and the tool is self-adjusting with respect to lack of concentricity between the cylinder walls and the ring-wear ridge to be removed.

I claim:
1. A cylinder ridge reamer adapted for removal of ring-wear, or the like, ridges formed on the wall of a cylinder comprising a base section for rigidly mounting the reamer as a whole in a cylinder having a ridge to be reamed, a blade section rotatably mounted upon said base section, a reamer blade slidably carried by said blade section for movement toward and away from the cylinder ridge to be reamed, and drive means including a drive element rotatably supported on said base section, friction means acting between said base section and drive element tending to maintain said drive element against rotation, and means connected between said drive element and said blade and slidably carried by said blade section for rotation thereby about said drive element when the latter is held against rotation, for resultant movement toward and away from the cylinder ridge for moving said blade correspondingly toward and away from the cylinder ridge.

2. A cylinder ridge reamer adapted for removal of ring-wear or the like ridges formed on the wall of a cylinder comprising a base section for rigidly mounting the reamer as a whole in a cylinder having a ridge to be reamed, a blade section rotatably mounted upon said base section, a reamer blade carried by said blade section for movement toward and from the cylinder ridge to be reamed, and drive means for automatically moving said blade toward and from the cylinder ridge, said drive means including a pinion driven by rotation of said blade section, a rack associated with said blade and meshed with said pinion to move said blade toward and from the cylinder ridge as said blade section is rotated in one direction or the other, and a friction drive support for said pinion adapted to slip terminating relative rotation of said blade when said blade is engaged with the cylinder ridge under a predetermined pressure.

3. A cylinder ridge reamer of the type adapted to remove a ring-wear ridge formed on the wall of an engine cylinder, comprising a base portion, a head portion supported for rotation on said base portion, a reamer blade unit supported on said head portion for rotative movement therewith and for movement transverse said head portion toward and away from the ring-wear ridge to be removed, said reamer blade unit having a toothed rack, and a friction transmission supported on said base portion and operatively connected to said toothed rack to move said reamer blade unit into yieldable reaming relation with the ring-wear ridge as said head portion is rotated in one direction and to move said reamer blade unit away from the ring-wear ridge as said head portion is rotated in the other direction.

4. A cylinder ridge reamer for removing a ring-wear ridge formed on the wall of an engine cylinder, comprising a base portion, means for clamping said base portion in the cylinder, a head portion supported for rotation on said base portion, a reamer blade unit supported on said head portion for rotative movement therewith and for movement transverse said base portion toward and away from the ring-wear ridge to be removed, said reamer blade unit having a gear rack, and transmission means supported on said base portion and enclosed in said head portion for moving said reamer blade unit transverse said base portion, said transmission means being normally invariably frictionally connected with said base portion by a spring and having a pinion in mesh with said rack and the transmission means being thereby adapted to move said reamer blade unit into reaming relation with the ring-wear ridge as said head portion is rotated in one direction and to move said reamer blade unit away from the ring-wear ridge as said head portion is rotated in the other direction.

5. A cylinder ridge reamer for removing a ring-wear ridge formed on the wall of an engine cylinder, comprising a base portion, a head portion supported for rotation on said base portion, said head portion having an axially disposed bore, a reamer blade unit supported on the external side walls of said head portion for rotative movement therewith and for movement transverse said head portion toward and away from the ring-wear ridge to be removed, a pinion gear rotatably supported on said base portion and disposed in the bore in said head portion, said pinion gear being operatively connected to said reamer blade unit, and a friction element frictionally abutting said pinion gear with a normally invariable friction to restrain rotation of said pinion gear on said base portion and to move and hold said reamer blade unit with substantially uniform pressure against the ring-wear ridge as said head portion is rotated in one direction and to move said reamer blade unit away from the ring-wear ridge as said head portion is rotated in the other direction.

6. A cylinder ridge reamer for removing a ring-wear ridge formed on the wall of an engine cylinder, comprising a base portion, a head portion supported for rotation on said base portion, said head portion having its external side wall cutaway to form a flat surface thereon disposed parallel with the axis of said head portion and spaced therefrom, reaming means supported on said flat surface for rotative movement with said head portion and for sliding movement on said flat surface transverse the axis of said head portion toward and away from the ring-wear ridge to be removed, said reaming means having a gear rack movable therewith, a transmission means supported on said base portion and enclosed in said head portion for transmitting movement to said reaming means during rotary movement of said head portion, said transmission means comprising a pinion gear rotatably supported on said base portion and operatively meshed with said gear rack, a friction element abutting one side of said pinion gear, and a compression spring pressing said element against said gear at a normally invariable pressure to resist rotation of said gear on said base portion to move said reaming means against the ring-wear ridge and to hold said reaming means against said ridge at a uniform reaming pressure as said head portion is rotated in one direction and to move said reaming means away from the ridge as said head portion is rotated in the other direction.

7. A cylinder ridge reamer for removing ring-wear and the like ridges formed on the wall of a cylinder comprising a gear supported for rotation on the axis of the cylinder, a first supporting means for supporting said gear, means for clamping said first supporting means in the cylinder, friction means carried by said first said supporting means to continuously and frictionally resist rotation of said gear on said first said supporting means, a second supporting means rotatably supported on said first said supporting means, and reaming means supported on said second said supporting means, said reaming means including a blade and a gear rack directly engaging said blade and operatively meshed with said gear for tangential movement relative to said gear when said friction means is effective to prevent rotation of said gear and for rotary movement with said gear when said friction means is ineffective to prevent rotation of said gear.

HENRY ROBERT BILLETER.

REFERENCES CITED

The following references are of record in the file of this patent:

UNITED STATES PATENTS

| Number | Name | Date |
|---|---|---|
| 519,405 | Horton | May 8, 1894 |
| 1,611,638 | Habel | Dec. 21, 1926 |
| 2,356,651 | Chandler | Aug. 22, 1944 |
| 2,380,605 | Mitchell | July 21, 1945 |
| 2,457,040 | Hall | Dec. 21, 1948 |

FOREIGN PATENTS

| Number | Country | Date |
|---|---|---|
| 222,341 | Germany | May 26, 1910 |